INVENTOR.
H. M. FOX
BY Hudson & Young
ATTORNEYS.

INVENTOR.
H. M. FOX

BY Hudson & Young

ATTORNEYS

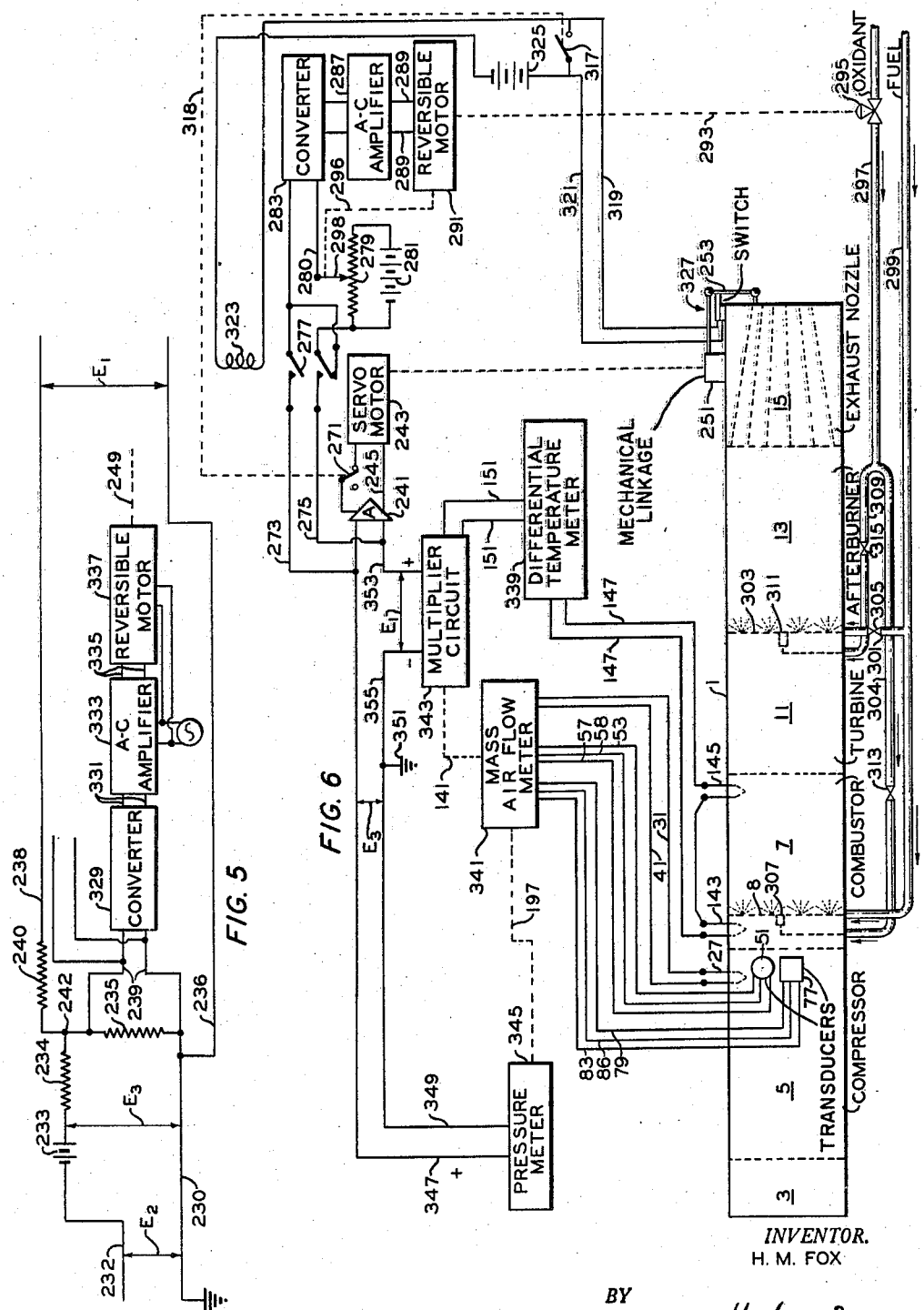

INVENTOR.
H. M. FOX
BY
*Hudson & Young*
ATTORNEYS

United States Patent Office 2,878,643
Patented Mar. 24, 1959

2,878,643

COMBUSTION STABILIZATION CONTROL SYSTEM RESPONSIVE TO OXIDANT CONCENTRATION

Homer M. Fox, Bartlesville, Okla., assignor to Phillips Petroleum Company, a corporation of Delaware Application May 9, 1955, Serial No. 506,790

8 Claims. (Cl. 60—35.6)

This invention relates to a means and method for maintaining stable operating conditions in a burning zone. In a more specific aspect, this invention relates to a means and method for maintaining stable operating conditions in a jet engine. In a further aspect, this invention relates to a means and method for maintaining stable combustion in a continuous jet propulsion engine under varying operating conditions.

Jet engines have only in the last few years been used in large numbers for the purpose of propelling aircraft and they have been found to be highly advantageous for use in high speed planes. With the increase in use of such engines, however, a multitude of operational problems has also come to be recognized.

A jet engine comprises three general parts; first, an air intake section; second, a fuel addition and combustion section; and third, an exhaust section. The air intake section and means for effecting such air intake is roughly divided into three classes, i. e., the type found in a ram jet, a pulse jet, and a jet engine employing a rotating compressor such as a turbine compressor operated by a gas turbine as motivating power for introducing the air into the combustion section. These different types of air intake systems, though substantially different in mechanical form, all serve the same function in each engine, namely, providing the necessary air supply to the combustion section. The comustion section, including the fuel injection system and the exhaust system, are somewhat similar in each type of engine. The purpose of operation in each of the engine types is similar, namely, to burn the fuel and to utilize as much as possible of the heat energy added in producing thrust for the engine. The major difference in these combustion and exhaust sections is found when comparing the ram jet or pulse jet engine types with the gas turbine engine. In the gas turbine engine, the combustion gases pass through a turbine which utilizes part of the heat energy of the combustion gases in driving the air compressor so as to furnish additional air for the combustion zone. The gases are then exhausted to the atmosphere through the exhaust section or tail pipe with a concomitant production of thrust. In the case of the ram jet and pulse jet engines, the hot gases pass directly from the combustion section to the exhaust or tail pipe section and it is thus more difficult to establish as clear a line of demarcation between the zones of such engines. Two other types of engines, very similar to those discussed above, are the turboprop and the turbopropjet engines. The general features of these engines are well known and a common feature of each of these two engines with those discussed above is the combustion zone which ordinarily comprises an air inlet and fuel mixing section, followed by a section in which the combustion takes place. The hot gases resulting from the combustion are then passed to a power producing section, the exact form of which depends upon the type of engine.

The general trend of thought concerning the operation of jet engines has erroneously been that hydrocarbons do not vary sufficiently in their burning characteristics to make a material difference in the operation of any given jet engine. For that reason, emphasis has for some time been placed upon engine research so as to determine the design of a jet engine which would have such a structure as would overcome the multitude of operational difficulties which are inherently encountered in jet engines. Such operational difficulties have to date been only partially overcome.

Some of the problems which are encountered in the operation of jet engines are exemplified by those encountered in a turbo-jet engine. Performance of a jet engine is dependent to a large extent upon the "temperature rise" which is obtainable in the particular engine. Temperature rise is that increase in temperature between the inlet to the combustor and the temperature of the gases at the combustor exhaust outlet. In a turbo-jet engine, the temperature rise must be carefully controlled for the operation of a turbo-jet engine is limited by the ability of the turbine blades to withstand high temperatures. Fuel which is supplied to the combustor is burned in the presence of supplied air and raises the temperature of the combustion gases and unused air by the heat of combustion. An excess of air is conventionally utilized in the operation of turbo-jet engines to control the temperature of the gases contacting the turbine blades. Such a large quantity of air is utilized in the operation of jet engines that the air flow reaches very high velocities. The high air velocities tend to pose many additional problems in the operation of jet engines, which problems are very difficult to overcome. The hot gases are expanded and in the turbo-jet engine are expanded through the turbine section which provides power for the compressor. Further expansion of the gases in a turbo-jet engine as well as in a ram jet engine or pulse jet engine takes place in a rearwardly extending exhaust nozzle to provide a substantial increase in gas velocity. The thrust which is produced by the engine equals the gas mass flowing through the exhaust duct times its increase in speed according to the law of momentum.

For each engine speed at a given altitude, a certain temperature rise is required for the operation of any given jet engine. Combustor inlet pressure and mass air flow through the engine imposes a limitation upon the combustion of any fuel utilized in the operation of the engine. For each combination of combustor inlet pressure and mass air flow there exists for any given fuel a maximum attainable temperature rise which depends upon the combustion stability performance of that fuel under the combination of those conditions. As the operating conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Rich mixture blow-out is the primary controlling characteristic of turbo-jet engine performance since it defines the maximum thrust output at a given altitude. When the temperature rise required at a given engine speed and at a given altitude corresponds to the maximum temperature rise obtainable with a given fuel, a very definite operational limit is imposed upon that jet engine when operating with that specific fuel. In order to operate the engine under more severe operating conditions, it is necessary therefore, to obtain and use a fuel which has stable combustion characteristics over a broader range of conditions than the fuel with which the maximum limit of operation has been reached. Similar operational problems are encountered in pulse jet and ram jet engines.

It has been determined heretofore that for any particular mass air flow there is a minimum pressure below which stable combustion cannot be maintained in a thermal jet combustion chamber. It has been further found that with a particular combustor operating on a given fuel the equation $$\frac{P_2^{1.46}}{W_a} = C_o$$

wherein $P_2$ equals inlet static pressure to the combustion chamber, $W_a$ equals mass air flow, and $C_o$ equals a constant, prescribes the minimum conditions for stable combustion at a prescribed combustor temperature rise. It has been further determined that with a variation of $\Delta T$ the equation $$\frac{P_2^{1.46}}{W_a} = k \Delta T_{max}$$

wherein $\Delta T_{max}$ is the maximum stable temperature rise, describes the dividing line between stable and unstable combustion. The $k$ in this equation is dependent upon the characteristics of the particular engine and the fuel being burned therein. Thus, when a particular temperature rise across the combustor and a particular mass air flow through that combustor are fixed, the latter equation describes a minimum pressure at which stable combustion is maintained. The function, $$\frac{P_2^{1.46}}{W_a}$$

is known as the reciprocal severity factor.

Combustion efficiency bears a very definite relation to the temperature rise across the combustor. For a particular value of combustor air pressure and mass air flow, the combustion efficiency is often lower at the maximum $\Delta T$ at which stable combustion is effected. At a somewhat lower $\Delta T$, however, the reduction in $\Delta T$ being effected by a decrease in fuel-air ratio, the combustion efficiency is improved. The curve of combustion efficiency versus $\Delta T$ for a minimum operable $\Delta T$ may show a decrease, but it usually shows a gradual efficiency increase in a substantially straight line over most of the range of the curve with an inflection which usually occurs near the maximum $\Delta T$ such that the combustion efficiency drops off quite rapidly to a very low value as the maximum operable temperature rise is approached. Stated in a broader sense, it has been found that combustion efficiency is related to the severity of inlet conditions as they affect combustion described by the reciprocal severity factor, $$\frac{P_2^{1.46}}{W_a}$$

In the operation of jet aircraft at varying altitudes, combustion efficiency gradually decreases in the direction of lower reciprocal severity factor, $$\frac{P_2^{1.46}}{W_a}$$

with an increase in altitude until a point is reached near the altitude operational limit of the engine where an inflection point occurs and combustion efficiency drops rapidly to a very low value before complete engine failure.

An object of this invention is to provide a means and method for maintaining stable operating conditions in a burning zone.

Another object is to provide an improved control system for operating engines.

Another object is to provide a means and method for continuously maintaining stable operating conditions in jet engines under varying operating conditions.

Another object of the invention is to reduce cycling in jet engines.

A still further object is to provide a method for increasing the operational limit of jet engines.

Other and further objects will be apparent upon study of the accompanying disclosure.

I have discovered that stable operating conditions are maintained in a burning zone by controlling the concentration of oxidant in the combustion air in said zone in response to mass air flow and temperature rise through the burning zone so as to obtain that concentration of oxidant within the burning zone which is necessary for stable operation under varying operating conditions. More specifically, I have discovered that stable combustion is provided in a combustion zone of a jet engine by controlling the partial pressure of oxygen in said zone by controlling pressure within said zone, or by injecting an oxidant into the combustion zone, or preferably, by controlling pressure until a pre-selected pressure is achieved within the zone and then injecting an oxidant into the zone to supplement the pressure control as needed, all being done in response to mass air flow and temperature rise in the combustion zone.

Better understanding of this invention will be obtained by referring to the accompanying drawings in which:

Figure 5 is a partial schematic representation of a modification of the embodiment shown in Figure 1;

Figure 6 is a schematic representation of a further modification of the embodiment shown in Figure 1;

Figure 8:
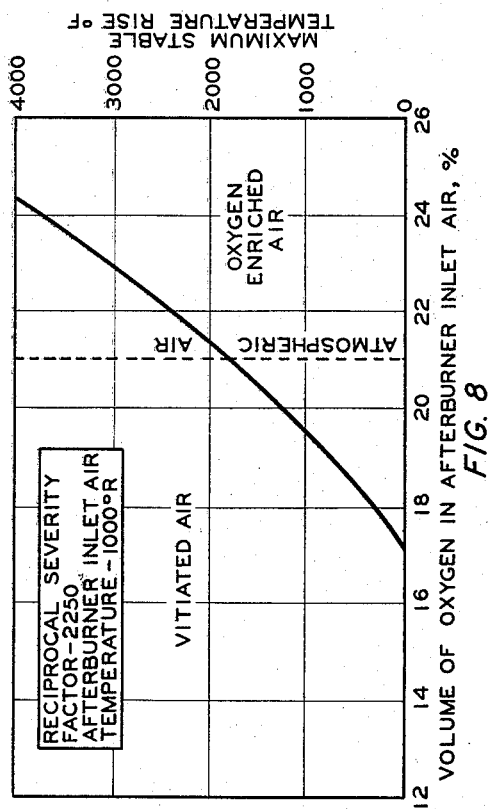
Figure 9:
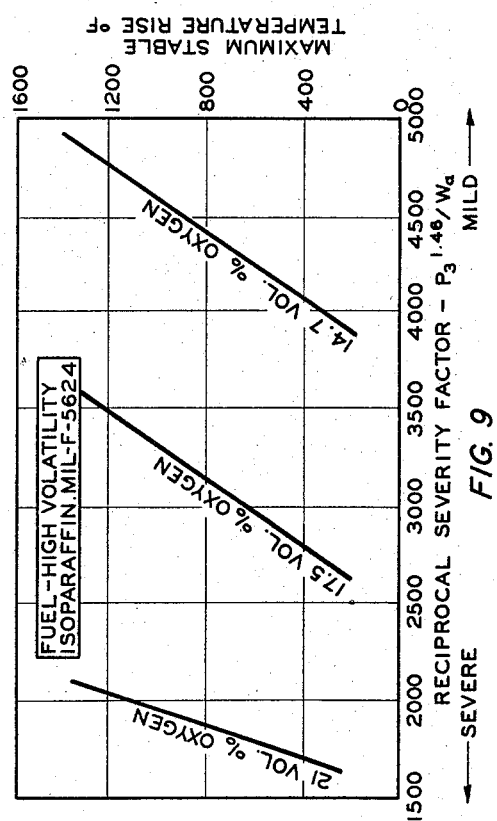

Figure 8 is a graph which shows the effect of oxygen concentration on maximum stable temperature rise in an afterburner combustor system in which the inlet air temperature is 1000° R. and the reciprocal severity factor is 2250; and Figure 9 is a graph which shows that, as the concentration of oxidant in the combustion air supplied to an afterburner becomes smaller, an increase in the reciprocal severity factor is required to obtain comparable levels of maximum stable temperature rise.

Figure 1:
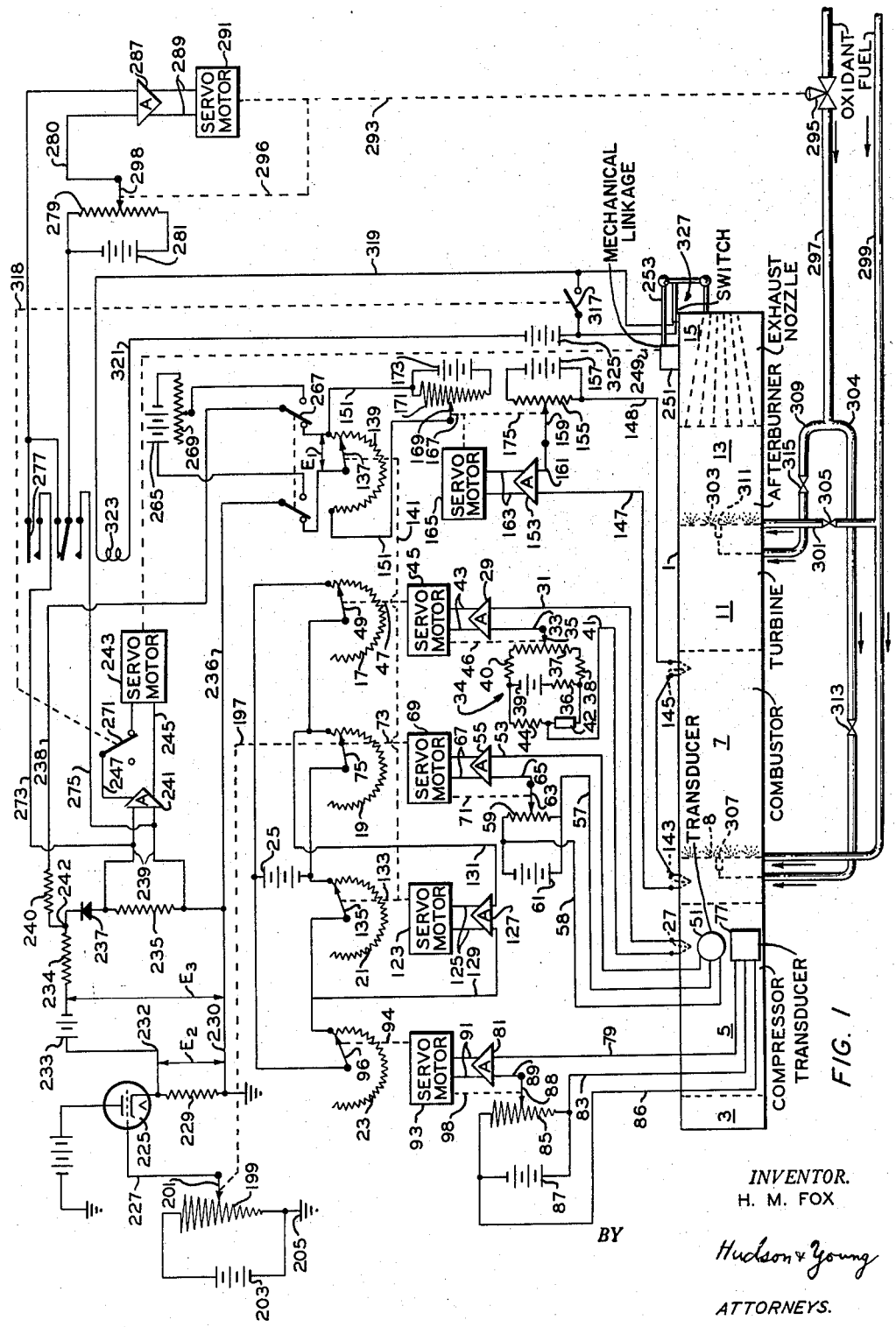
Figure 1 is a diagrammatic representation of a system for controlling the concentration of oxidant in the combustion air in a jet engine in accordance with this invention.

Referring now to the system shown in Figure 1 of the drawings, a jet engine 1 comprises an air inlet section 3 in its forward end portion, which section includes a compressor section 5 therein. A combustor section 7 is disposed immediately downstream from compressor section 5 and is provided with a fuel injection means 8 in the forward end portion of combustor section 7. A turbine section 11 is disposed immediately downstream of combustor section 7 and an afterburner section 13 is disposed immediately downstream of turbine section 11. A variable exhaust nozzle 15, which can be spring-biased in the open position, immediately follows the afterburner section 13. In ram jet or pulse jet engines a pressure control can be provided at the jet nozzle for controlling the combustion conditions within the combustor so as to maintain an operable pressure therein. Such a structure is very similar to that shown in Figure 1. On a turbo-prop engine, the pressure control for the combustor can be at the downstream end of the combustor and immediately upstream from the turbine blades.

Four variable resistances 17, 19, 21 and 23 and a potential source 25 are arranged in the form of a bridge so that mass air flow through the combustor can be measured. The inlet air temperature is obtained by means of a temperature detection device 27, such as a thermocouple, which is positioned within the air inlet section 3.

An amplifier 29 has one of its input terminals connected by a lead 31 to one output terminal of temperature detection device 27 and the other input terminal of amplifier 29 is connected by a lead 33 to a bridge circuit indicated generally as 34. The other output terminal of temperature detection device 27 is connected by a lead 41 through bridge circuit 34 to said other input terminal of amplifier 29.

Bridge circuit 34 includes a potentiometer 37, having its wiper arm 35 connected by a lead 33 to said other input terminal of amplifier 29, and a potential source 39 connected across potentiometer 37 through resistances 36, 38 and 40. A temperature sensitive resistor 42, having a positive coefficient of thermal resistivity, is connected in series with a resistance 44, potential source 39 and a resistance 36. Temperature sensitive resistor 42 is employed as a cold junction compensator for temperature detection device 27. Lead 41 connects said other output terminal of temperature detection device 27 to a junction in bridge circuit 34 between temperature sensitive resistor 42 and resistance 44.

The amplified signal from temperature detection device 27 is transmitted through a pair of leads 43 to a servomotor 45. Servomotor 45 is actuated by the amplified signal from temperature detection device 27 and, through a mechanical linkage 46, adjusts the wiper arm 35 of potentiometer 37 and, through a mechanical linkage 47, adjusts the wiper arm 49 of variable resistance 17.

It is to be noted that amplifier 29 is an alternating current amplifier having a built-in converter and that motor 45 is a reversible, alternating current motor as are all the amplifiers and motors shown and described herein. The components of such a system, namely, a converter, an amplifier and a reversible motor, are well known in the art as a means for converting a direct current potential to an alternating current potential which can be used to drive a reversible motor. A detailed illustration of such a unit is set forth in "The Electronic Control Handbook" by Batcher and Moulic, published by Caldwell-Clements, Inc., 480 Lexington Avenue, New York, 17, New York (1946), page 298, Figure 13–V.

Static pressure at the inlet end of combustor section 7 is detected by a resistance bridge strain gauge transducer 51 which is mounted within the air inlet section 3 or at the upstream end of combustor section 7. Transducer 51 is connected by a lead 53 to one input terminal of an amplifier 55, by a lead 57 to one end of a potentiometer 59, and by a lead 58 to the other end of potentiometer 59. A potential source 61 is connected across potentiometer 59. The wiper arm 63 of potentiometer 59 is connected by a lead 65 to the other input terminal of amplifier 55. The amplified signal from transducer 51 is transmitted by a pair of leads 67 to a servomotor 69. Servomotor 69 is connected by a mechanical linkage 71 to wiper arm 63 of potentiometer 59 and by means of a mechanical linkage 73 to the wiper arm 75 of variable resistance 19. Thus, wiper arm 75 of variable resistance 19 is adjusted upon actuation of servomotor 69 in response to the amplified signal from transducer 51.

The volume of air per unit of time passing through combustor section 7 is detected by a resistance bridge strain gauge transducer 77 which is mounted within the air inlet section 3. Transducer 77 is connected by a lead 79 to one input terminal of an amplifier 81, by a lead 83 to one end terminal of a potentiometer 85 and by a lead 86 to the other end terminal of potentiometer 85. The wiper arm 88 of potentiometer 85 is connected by a lead 89 to the other input terminal of amplifier 81. The winding of potentiometer 85 is a square root winding. A potential source 87 is applied across the end terminals of potentiometer 85 and the winding of potentiometer 85 is such that the potential obtained across an end terminal and wiper arm 88 thereof is in proportion to the square root of the pressure indicated by transducer 77. From the well known Pitot tube equation, $V = \sqrt{2g\Delta H}$, wherein V is the velocity, $g$ is 32.1740 and $\Delta H$ is the difference in pressure between the static pressure and the impact pressure, it will be evident that the final signal thus obtained through potentiometer 85 is a measure of the volume of air per unit of time passing into the combustor inlet. The amplified signal produced by amplifier 81 is transmitted by a pair of leads 91 to a servomotor 93. Motor 93 is connected by a mechanical linkage 94 to the wiper arm 96 of variable resistance 23 and by a mechanical linkage 98 to wiper arm 88 of potentiometer 85.

A servomotor 123 is connected by a pair of leads 125 to an amplifier 127. One input terminal of amplifier 127 is connected by a lead 129 to a point in the bridge circuit between variable resistances 21 and 23 and the other input terminal of amplifier 127 is connected by means of a lead 131 to a second point in the bridge circuit between resistances 17 and 19. Servomotor 123 is connected by a mechanical linkage 133 to the wiper arm 135 of variable resistance 21. Movement of wiper arm 135 upon actuation of servomotor 123 through the bridge circuit produces a zero potential between the points of connection of the bridge circuit to servomotor 123 thus balancing the bridge circuit. The operation of servomotor 123 is in proportion to the mass air flow as will be discussed more fully as follows.

The ideal gas equation relates the pressure, volume, temperature and number of mols of gas as set forth as follows:

$$PV = nRT$$

wherein P is the pressure, V is the volume, $n$ is the number of mols, R is a constant and T is the temperature. Multiplying each side of the equation by the molecular weight of the gas (M) gives the equation $$MPV = nMRT$$

The product of the number of mols of air and molecular weight thereof is the weight of the gas being considered and the equation can thus be rewritten as $$MPV = WRT$$

wherein W is the weight of the gas.

By rearrangement, the equation becomes $$\frac{P}{T} = \frac{(R)}{(M)} \frac{W}{V}$$

As the gas here being considered is air, the value of M is fixed, and the value of the term $R/M$ is constant and can be represented by $k'$. Thus the equation can be written in the form of $$\frac{P}{T} = k' \frac{W}{V}$$

wherein W is the weight of the air being considered and V the volume of the air. If the pressure, temperature, and volume terms in the equation are those of the air at the inlet to the combustor (the volume being in terms of volume per unit of time), the W in the equation becomes the mass air flow entering the combustor. Thus the equation becomes $$\frac{P_2}{T_2} = k_2 \frac{W_a}{V_2}$$

the subscript 2 indicating the point of measurement of the terms, the combustor inlet.

In the bridge circuit shown and heretofore discussed, with the resistances varied by the servo mechanisms as described above, the operation of servomotor 123 is proportional to $W_a$ (mass air flow). The operation of this device is in accordance with the equation $$P_2^{1.46} = k_1 W_a \Delta T$$

which is a rearranged form of the original relationship but which is readily seen to be the same equation. This equation is later changed by the inclusion of a constant, which constant is fully described in the subsequent portion of this discussion. To operate according to the latter equation, the terms $P_2^{1.46}$ and $k_1 W_a \Delta T$ must be determined.

In order to determine $k_1 W_a \Delta T$, the operation of servo motor 123 adjusts the wiper arm 137 of a potentiometer 139 by means of a mechanical linkage 141. Potentiometer 139 has a potential imposed upon it in response to the potential obtained by bucking signal potentials from a pair of temperature detection devices 143 and 145 which are disposed at the upstream and downstream ends, respectively, of combustor section 7. The signal potential which is provided by temperature detection devices 143 and 145 is transmitted by a lead 147 to one input terminal of an amplifier 153 and by a lead 148 to an end terminal of a potentiometer 155, across which is applied a potential source 157. The wiper arm 159 of potentiometer 155 is connected by a lead 161 to the other input terminal of amplifier 153. The amplified signal produced by amplifier 153 is transmitted by a pair of leads 163 to a servo motor 165. Motor 165 is mechanically linked by mechanical linkage 167 to a wiper arm 169 of a potentiometer 171, across which is applied a potential source 173, and by a mechanical linkage 175 to wiper arm 159 of potentiometer 155. One end terminal of potentiometer 171 and the wiper arm 169 are connected by leads 151 to the end terminals of potentiometer 139. A selected potential $E_1$ is taken from potentiometer 139, which potential $E_1$ is proportional to the term $k_1 W_a \Delta T$. The winding of potentiometer 171 is tapered in such a manner that the potential $E_1$ taken from potentiometer 139 by wiper arm 137 has a linear relationship to the position of wiper arm 169 of potentiometer 171.

A second potential which is proportional to $P_2^{1.46}$ is obtained by utilizing the resistance bridge strain gauge transducer 51 and its associated amplifier 55, servo motor 69 and circuitry therefor. It will be recalled that transducer 51 senses the static pressure of the incoming air and the shaft of servo motor 69 reflects mechanically this static pressure $P_2$. To this end, the shaft of motor 69 is connected by a mechanical linkage 197 to a wiper arm 201 of a tapered potentiometer 199 across which is applied a potential source 203. One end terminal of potentiometer 199 is connected to a ground terminal 205. The winding of tapered potentiometer 199 is such that the potential taken from wiper arm 201 is a potential which is in proportion to $P_2^{1.46}$, i. e., the winding of potentiometer 199 is to the 1.46 power. Thus, movement of wiper arm 201 of potentiometer 199 provides for the withdrawal from potentiometer 199 of a potential in proportion to $P_2^{1.46}$.

The potential which is obtained through potentiometer 199 is passed to the grid of a triode tube 225 by a lead 227 which extends between wiper arm 201 and the grid of tube 225. Tube 225 is in a cathode follower circuit with a resistance 229. A pair of leads 230 and 232 are connected to the end terminals of resistance 229 and a potential $E_2$ appears across leads 230 and 232, which potential is in proportion to $P_2^{1.46}$ plus a constant $x$.

Figure 7:
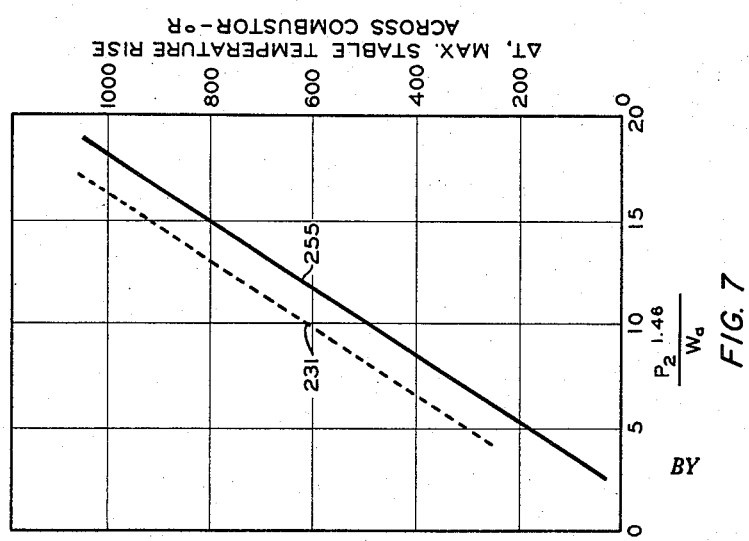
Figure 7 is a schematic representation of the equation describing the absolute limiting relationship between pressure, mass air flow, and $\Delta T_{max}$ degrees Rankine for one particular combustor and fuel.

By the previously described system, the terms $W_a \Delta T$ in the equation $$P_2^{1.46} = k_1 W_a \Delta T$$

describing the dotted line 231 in Figure 7 dividing operable and inoperable combustion conditions, are obtained in the form of electrical potentials. However, in order to control pressure within jet engine 1, and thereby to control the partial pressure of oxygen and concentration of oxidant in jet engine 1, to such an extent that both stable combustion conditions and efficient combustion conditions are obtained, the term $P_2^{1.46} + x$ must be reduced so that the following equation is formulated:

$$k_1 W_a \Delta T = P_2^{1.46} + b$$

where $b$ is less positive than $x$, and $\Delta T$ is the operating temperature rise across the combustor. This new equation, therefore, is the original equation displaced in the direction of stable and efficient combustion conditions.

A potential $E_3$ which is proportional to the term $P_2^{1.46} + b$ is obtained by bucking the potential $E_2$ with a potential source 233. The potential $E_1$ is introduced into a computer circuit comprising the above-described cathode follower circuit, potential source 233, a fixed resistance 234, a rectifier 237 and a resistance 235. Potential $E_1$ is connected to the computer circuit by a lead 236 connected to lead 230 and by a lead 238 through a coupling resistor 240 connected to a junction 242 between resistor 234 and rectifier 237. The potential $E_3$ is put into the circuit so that the potentials $E_1$ and $E_3$ are in bucking relationship to each other. Whenever a current flows through resistance 235, a signal is transmitted through a pair of leads 239 to an amplifier 241 and the amplified signal from amplifier 241 is transmitted to a servo motor 243 by a lead 245 and a lead 247 causing servo motor 243 to be energized. Although the input to amplifier 241 can never reverse polarity because of the blocking effect of rectifier 237, nozzle 15 is effectively controlled by servomotor 243 since it drives nozzle 15 to a closed position and nozzle 15, being spring loaded, tends to expand under zero servomotor torque.

Figure 2:
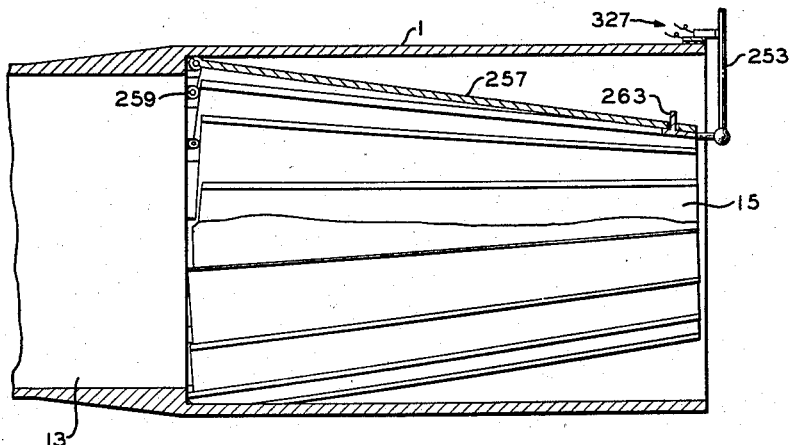
Figure 2 is an elevational representation, partly in section, of the variable exhaust nozzle of this invention in a normal position.
Figure 3:
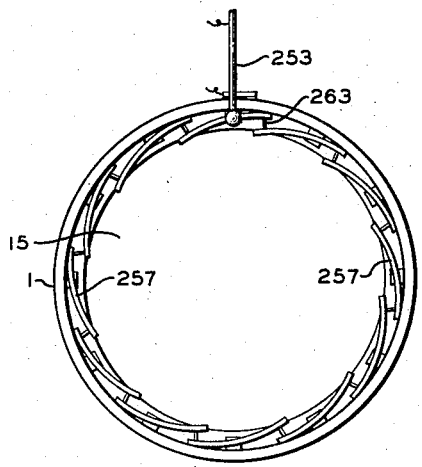
Figure 3 is an end view of the variable exhaust nozzle of this invention in a normal position.
Figure 4:
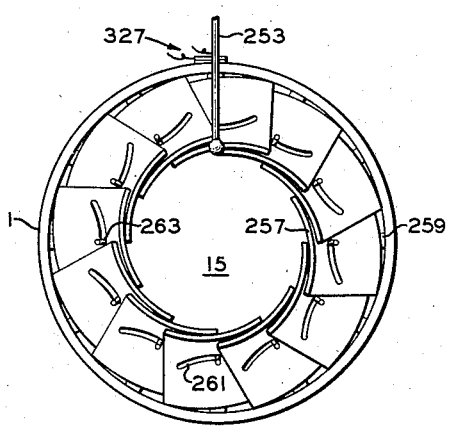
Figure 4 is an end view of the variable exhaust nozzle of this invention in a constricted position.

Servo motor 243 is connected by a mechanical linkage 249 to a control unit which is diagrammatically illustrated in Figures 2, 3 and 4 and which is connected to variable exhaust nozzle 15 through a mechanical linkage unit 251 which includes an actuator rod 253 so that energization of servo motor 243 and the resulting activation of control unit 251 partially closes variable exhaust nozzle 15, thus increasing the pressure and partial pressure of oxygen within the jet engine combustion zone. When no current is flowing through resistance 235, servo motor 243 is not actuated and adjustable nozzle 15 is expanded to its normally open position by the pressure of exhaust gases from the jet engine. When operating the jet engine, a change in operating conditions which results in an increase of potential $E_1$ activates servo motor 243 to reduce the area of nozzle 15. Reduction of the area of nozzle 15 increases the pressure within the combustor, thus increasing the potential $E_3$. In this manner the increased potential of $E_1$ is bucked by the increased potential of $E_3$ so that servo motor 243 maintains adjustable nozzle 15 in its constricted or adjusted position, thereby keeping the adjusted pressure within the combustor of the jet engine at a point on the solid operating line 255 of Figure 7 having the proper value as determined by mass air flow and temperature rise across the combustor.

Referring now to Figures 2, 3 and 4, the adjustable nozzle of this invention comprises a plurality of overlapping plates 257 which are hinged or flexibly connected at the upstream end of nozzle 15 at points 259 to the shell of jet engine 1. Each of the overlapping plates 257 is provided with a curved or lateral slot 261 and each plate is likewise provided with a pin 263 which extends upwardly so as to extend through slot 261 of the plate 257 which overlaps it. Thus, as control unit 251 causes actuator rod 253 to force one of the overlapping plates 257 inwardly toward the axis of the jet engine, all of the plates 257 are caused to move inwardly by the interaction of the pins 263 and slot 261 so as to constrict the opening through which the exhaust gases are allowed to pass. In this manner, the pressure, and consequently the concentration of oxidant as well, within combustion section 7 is increased in direct response to an increase in potential $E_1$.

The particular means whereby the pressure control may be obtained in a jet engine may take any number of different forms which may be modifications of the particular one described herein. In general, such a device will be in the form of a variable area nozzle, some such devices being known to the art. With the particular control device shown, the area of the opening through the variable nozzle should be allowed to increase in response to the pressure within the jet engine and as potentials $E_1$ and $E_3$ come into balance, since a positive opening mechanism is provided by this device.

Various arrangements of the equation defining stable and unstable combustion conditions may be used. Upon displacement of the new equation by inclusion of a constant for definition of another suitable operating line, it will be possible to use various other particular devices to provide suitable control of combustion conditions. For example, the equation.

$$\Delta T = \frac{k_3 P_2^{1.46}}{W_a}$$

is a form of the equation which may be used in preference to the other two forms discussed above. A control device responsive to each side of this equation may be established in the light of and as a minor modification of this disclosure.

The device described may be modified so as to be useful for starting engines in flight. During the operation of multi-engine aircraft powered by jet engines it is common practice to cruise with one or more engines cut off and the remaining engines operating near full load. It is desirable to operate with the engines at as close to full load as possible in a jet powered craft for the reason that the efficiency of jet engines is much more favorable under highly loaded conditions. Restarting the engines in flight, however, presents a major problem, especially at high altitudes where the air pressure in the engine is approximately atmospheric and the air velocity through the engines is that which results from the forward motion of the aircraft. The pressure and mass air flow are quite often in a range where starting of the engine is at least quite difficult and many times impossible.

The present device may be modified so as to allow disconnecting the leads from potentiometer 139 to the circuit of triode tube 225 and including a means for applying a suitable manually adjustable potential to this circuit. By this means the pressure control of the engine may be activated and favorable starting conditions obtained in response to manual control. Once the engine is started, the automatic control could be reestablished and the manual control cut out of the circuit. Such a means is illustrated in Figure 1 and includes a constant potential source 265, a manually operated switching means 267 and a manually operated resistance 269.

As has been pointed out hereinbefore, the present invention is based on the discovery that the maximum stable temperature rise developed in a combustion zone of a jet engine and, therefore, the combustion stability of the combustion process, for particular severity of inlet conditions, is assured by controlling the concentration of oxidant in the combustion air supplied to the combustion zone in response to mass air flow and temperature rise through the combustion zone. Accordingly, there is illustrated in Figure 1 a system for controlling the concentration of oxidant in the combustion zone of a jet engine directly by introducing an oxidant into said combustion zone either to supplement the control of pressure previously described or independently of the pressure control set forth. To this end, a manually operated switch 271 is positioned in lead 247. Switch 271 is normally closed so that the variable exhaust nozzle 15 is connected to the control system set forth. When switch 271 is opened, however, variable exhaust nozzle 15 is disconnected from the control system. In order to utilize the oxidant injection system, the potential appearing across resistance 235 is transmitted to an amplifier 287 by leads 239, a lead 273, a lead 275, a relay switching means 277, a variable resistance 279 and a lead 280. A potential source 281 is applied across variable resistance 279. The signal resulting from bucking the potential across resistance 235 with the potential across variable resistance 279 is thus transmitted to the amplifier 287. The amplified signal produced by amplifier 287 is transmitted by leads 289 to a reversible motor 291. The rotational output of motor 291 is linked by a mechanical linkage 293 to a motor valve 295 controlling the flow of an oxidant in a conduit 297 and by a mechanical linkage 296 to the wiper arm 298 of variable resistance 279.

It will be noted from Figure 1 that fuel for the combustion section 7 of jet engine 1 is supplied through a conduit 299 to the fuel injection means 8 and by a conduit 301 to a fuel injection means 303 in afterburner section 13. A valve 305 is positioned in conduit 301 to permit the use of afterburning section as is desired. The oxidant in conduit 297 is transmitted by a conduit 304 to an oxidant injecting means 307 which is positioned directly behind fuel injection means 8 and by a conduit 309 to an oxidant injecting means 311 which is positioned directly behind fuel injection means 303 in afterburner section 13. A valve 313 is positioned in conduit 304 and a valve 315 is positioned in conduit 309. Valves 313 and 315 permit the use of the oxidant injection system in either or both combustion section 7 and afterburner section 13.

When it is desired to control the concentration of oxidant in the combustion section by the oxidant injecting system alone and independently of the pressure controlling system, switch 271 is opened. Switch 271 is ganged with a switch 317 by a mechanical linkage 318 so that switch 317 is closed when switch 271 is opened. Relay switching means 277 is closed when switch 317 is closed, thus establishing a circuit between a lead 319 and a lead 321 which are connected to the coil 323 of relay 277. The coil 323 is thereupon energized by a potential source 325 which is connected in lead 321. However, a preferred embodiment of my invention comprises the control of the concentration of oxidant in the combustion section by controlling the pressure in the combustion section to a preselected value by adjustment of variable nozzle 15 to a preselected position, i. e., its most constricted position, and by supplementing this control of oxidant by the oxidant injecting system when nozzle 15 has been adjusted to its most constricted position. Accordingly, manual switch 271 is normally closed and manual switch 317 is normally open and a switch 327 is positioned upon actuator rod 253 so as to close the circuit through lead 319, potential source 325, lead 321 and coil 323 when actuator rod 253 has adjusted nozzle 215 to its most constricted position. Upon the closing of switch 327, coil 323 is energized which closes switching means 277 and the oxidant injecting system is thereby energized, in accordance with this invention.

The oxidant which is injected into the combustion section and/or the afterburner section of the jet engine can be injected directly into these sections of the engine or can be passed into these sections through the fuel atomizing means. The oxidant can be liquid oxygen, but since liquid oxygen is ordinarily difficult to handle, other oxidants are usually employed. A preferred oxidant is nitric acid, such as white fuming nitric acid containing less than about 5 weight percent water or red fuming nitric acid containing less than about 5 weight water and up to about 24 weight percent nitrogen dioxide. Another preferred oxidant is hydrogen peroxide. Other oxidants which can be used by mixing them with the fuel itself or by incorporating them in a fluid which can be injected independently into the combustion zones of the jet engine include the metal manganates, permanganates, chlorates, perchlorates, hyperchlorites, chromates, persulphates, bichromates, and the like. Also, halogens such as fluorine, chlorine, bromine or iodine can also be employed. In the case where the oxidant is a solid material, the oxidant is injected into the combustion zone desired as a slurry in a liquid medium, such as the hydrocarbon fuel. Most of the oxidants can be used in either or both the primary combustor 7 or afterburner section 13; however, reaction products of some of these oxidants, e. g., potassium perchlorate, decompose into products having deleterious effects upon metal parts of the engine, such as the turbine blades of a turbo jet engine, and in this case the use of such oxidants is preferably restricted to the afterburner section of the engine.

Various modifications of the electrical circuit shown in Figure 1 will be apparent to those skilled in the art. A modification which is preferred in some applications is illustrated in Figure 5. In the modification shown in Figure 5, rectifier 237 has been deleted and potentials $E_1$ and $E_3$ are applied across resistor 235 in a bucking relationship to each other. The resultant potential across resistor 235 is transmitted by leads 239 to a converter 329 where the direct current potential is changed to an alternating current potential. The output of converter 329 is transmitted by a pair of leads 331 to an alternating current amplifier 333 and the output of amplifier 333 is transmitted by a pair of leads 335 to a reversible motor 337. The rotational output of motor 337 is linked by mechanical linkage 249 to control unit 251. It will be noted that a positive, mechanical opening and closing means is provided for variable nozzle 15. The signal represented by potential $E_1$ has a polarity which is 180° out of phase with the polarity of potential $E_3$. Thus, the resultant potential across resistance 235 is of a first polarity where potential $E_1$ is greater than potential $E_3$ and is of a second polarity when potential $E_3$ is greater than $E_1$. Reversible motor 337 produces a rotational output in response to the polarity of the signal impressed across its windings and thereby opens and closes nozzle 15 accordingly.

A further modification of the system set forth and described in connection wtih Figure 1 is shown in Figure 6. The electrical circuit by which potentials $E_1$ and $E_3$ are produced in response to mass air flow and temperature rise across the combustion zone of the engine is shown by a simplified block diagram which will be readily understood in view of the foregoing detailed description of Figure 1. Thus, differential temperature meter 339 comprises amplifier 153, motor 165 and associated circuitry of Figure 1. Mass air flow meter 341 comprises variable resistances 17, 19, 21 and 23 as well as amplifiers 29, 55, 127 and 81 and servomotors 45, 69, 123 and 93. Multiplier circuit 343 comprises potentiometer 139, the wiper arm 137 of which is linked by mechanical linkage 141 to servo motor 123 in mass air flow meter 341. Pressure meter 345 comprises amplifier 55 and motor 69 used jointly with mass air flow meter 341 by virtue of mechanical linkage 197, as well as 1.46 power winding potentiometer 199, potential source 203, and potential source 233. The output of pressure meter 345 is potential $E_3$, as was described in detail in connection with Figure 1, and the output of multiplier circuit 343 is potential $E_1$. Potential $E_3$ is transmitted by a lead 347 to one input terminal of amplifier 241 and by a lead 349 which is connected to a ground connection 351. Potential $E_1$ is transmitted by a lead 353 to the other input terminal of amplifier 241 and by a lead 355 which is also connected to ground at 351. Thus, potentials $E_1$ and $E_3$ are connected in a bucking relationship and the potential resulting from bucking potentials $E_3$ and $E_1$ is applied to amplifier 241 in order to energize servomotor 243 and variable nozzle 15 the same as has been described before in connection with Figure 1. The oxidant injection system is shown in Figure 6 as being connected across leads 353 and 347 so that it is energized in response to the potential resulting from bucking potentials $E_1$ and $E_3$ the same as was described in connection with Figure 1.

Figure 7 is a schematic representation of the equation describing the absolute limiting relationship between pressure, mass air flow and $\Delta T_{max}$ degrees Rankine for one particular combustor and fuel. This representation is shown on dotted line 231. Solid line 255 is a diagrammatic representation of a practical operating line such that operation in the zone on or to the right of line 255 maintains desirable combustion conditions within the combustion zone. Operation within the zone between solid line 255 and dotted line 231 reflects increasing signs of unsatisfactory operation and lower combustor efficiency due to flame instability. The zone to the left of dotted line 231 represents the area of operating conditions in which complete failure of the jet engine results. Thus, line 231 divides operable and inoperable combustion conditions.

The fact that the satisfactory combustion of a fuel in the combustion zone of a jet engine is related to the oxygen concentration of the gas in which the fuel is burned is demonstrated in Figure 8. In Figure 8, the relationship is shown between the volume percent of oxygen in the combustion air to the maximum stable temperature rise. The solid line in Figure 8 is applicable to a fuel having average combustion stability characteristics and the data for this line were calculated by use of the correlating factor of the equation, $$\frac{P_2^{1.46}}{W_a} \times \left(\frac{Ti}{610}\right)^{0.1(21-Z)} \times \left(\frac{Z}{21}\right)^4 = \text{correlating factor}$$

wherein $Ti$ is the temperature of the inlet air to combustion section 7 of jet engine 1 in ° F. and $Z$ is the volume percent of oxygen in said inlet air, and assuming a reciprocal severity factor $$\frac{(P_2^{1.46})}{W_a}$$

of 2250 and an air inlet temperature of 1000° R. The very large effect of a decreasing oxygen concentration is emphasized in Figure 8 by the indicated inability to obtain combustion under these conditions at less than about 17.2 percent oxygen and by the increase in maximum stable temperature rise from about 1750° F. at 21 percent oxygen to about 3700° F. at 24 percent oxygen.

Figure 9 demonstrates that the combustion stability becomes poorer as the concentration of oxygen in the inlet air decreases and that a reduction in the severity of inlet conditions (increase in reciprocal severity factor) is necessary to obtain comparable levels of maximum stable temperature rise.

It is evident that equivalent equations derived from the equation in lines 18–20, column 3, may be used as the controlling equation in place of that equation providing the proper changes are made in the control system. For example, the reciprocal severity factor $$\frac{P_2^{1.46}}{W_a}$$

may be transformed by suitable mathematical manipulation using the ideal gas laws into the form $$\frac{T_2 P_2^{0.46}}{V_2} \approx \frac{T_2 \sqrt{P_2}}{V_2}$$

where $T_2$ is the temperature in degrees Rankine at the inlet of the combustor, $P_2$ is the inlet air pressure in pounds per square foot, and $V_2$ is the inlet air velocity in feet per second under inlet conditions $T_2$ and $V_2$.

Many other modifications will be apparent to those skilled in the art upon study of the accompanying disclosure. It is believed that such modifications are within the spirit and scope of the invention as set forth herein.

I claim:

1. A system for maintaining stable combustion in a jet engine, which comprises in combination, means for transforming temperature rise within said engine to a first electrical potential, means for selecting as a second electrical potential a portion of said first potential in response to variations in mass air flow in said engine, means for transforming static inlet pressure in said engine to a third electrical potential corresponding to $P_2^{1.46}$ wherein $P_2$ is said static inlet pressure, a constant potential means, means for bucking said second potential with said third potential and said constant potential, and means for varying the partial pressure of oxygen in said engine in response to said bucking potentials.

2. A system in accordance with claim 1 wherein said means for varying the partial pressure of oxygen in said engine includes a means for varying the pressure in said engine in response to said bucking potentials.

3. A system in accordance with claim 1 wherein said means for varying the partial pressure of oxygen in said engine includes a means for injecting an oxidant into said engine in response to said bucking potentials.

4. A system in accordance with claim 1 wherein said means for varying the partial pressure of oxygen in said engine includes a means for varying the pressure in said engine in response to said bucking potentials, means for injecting an oxidant into said engine in response to said bucking potentials, and means for actuating said oxidant injecting means when said pressure varying means has increased said pressure to a preselected value.

5. A system for maintaining stable operating conditions in a jet engine which comprises a variable area exhaust nozzle in said jet engine, a mass air flow measuring system connected to said jet engine, a temperature rise measuring system including potential output means connected to a point upstream and a point downstream from a fuel inlet section in said jet engine, means connected to said temperature rise measuring system and said mass air flow system for providing a signal in response to change in said mass air flow measuring system which is a portion of the potential from said temperature rise measuring system, means for applying said signal to a computer circuit connected to said temperature rise measuring system, first means for applying a potential to said computer circuit in response to static pressure change in said jet engine, said first means being connected to said computer circuit and to said jet engine upstream of said fuel section, second means in said computer circuit for applying a negative constant potential to said first means, and actuator means connected to said variable area exhaust nozzle and said computer circuit.

6. A system for maintaining stable operating conditions in a jet engine which comprises, in combination, means for injecting an oxidant into a combustion zone of said engine, a mass air flow measuring system connected to said jet engine, a temperature rise measuring system including potential output means connected to a point upstream and a point downstream from a fuel inlet section in said jet engine, means connected to said temperature rise measuring system and said mass air flow system for providing a signal in response to change in said mass air flow measuring system which is a portion of the potential from said temperature rise measuring system, means for applying said signal to a computer circuit connected to said temperature rise measuring system, first means for applying a potential to said computer circuit in response to static pressure change in said jet engine, said first means being connected to said computer circuit and to said jet engine upstream of said fuel inlet section, second means in said computer circuit for applying a negative constant potential to said first means, and actuator means connected to said oxidant injecting means and said computer circuit.

7. A system for maintaining stable operating conditions in a jet engine which comprises, in combination, a mass air flow measuring system connected to said jet engine, a temperature rise measuring system including potential output means connected to a point upstream and a point downstream from a fuel inlet section in said jet engine, means connected to said temperature rise measuring system and said mass air flow system for providing a signal in response to change in said mass air flow measuring system which is a portion of the potential from said temperature rise measuring system, means for applying said signal to a computer circuit connected to said temperature rise measuring system, first means for applying a potential to said computer circuit in response to static pressure change in said jet engine, said first means being connected to said computer circuit and to said jet engine upstream of said fuel inlet section, second means in said computer circuit for applying a negative constant potential to said first means, a variable area exhaust nozzle in said jet engine, actuator means connected to said variable are exhaust nozzle and said computer circuit, means for injecting an oxidant into a combustion zone of said engine, and means associated with said actuator means for actuating said oxidant injecting means when said variable area nozzle has been adjusted to a preselected area.

8. A system for maintaining stable operating conditions in a jet engine which comprises, in combination, a means for controlling the partial pressure of oxygen in a combustion zone of said jet engine; a mass air flow measuring system connected to said jet engine, a temperature rise measuring system including potential output means connected to a point upstream and a point downstream from a fuel inlet section in said jet engine, means connected to said temperature rise measuring system and said mass air flow system for providing a signal in response to change in said mass air flow system which is a portion of the potential from said temperature rise measuring system, means for applying said signal to a computer circuit comprising a cathode follower circuit and a first potential source for applying a constant potential in bucking relation to said cathode follower circuit, said computer circuit being connected to said temperature rise measuring system, means for applying a potential to said cathode follower circuit in response to static pressure change in said jet engine, said means being connected to said cathode follower circuit and to said jet engine upstream of said fuel inlet section, and actuator means connected to said means for controlling the partial pressure of oxygen in a combustion zone of said engine and to said computer circuit.

References Cited in the file of this patent

UNITED STATES PATENTS

| | | |
|---|---|---|
| 2,689,452 | Jordan | Sept. 21, 1954 |
| 2,700,275 | Chandler et al. | Jan. 25, 1955 |